March 30, 1926.
A. HEUSER
1,579,110
LUBRICATOR FOR THE WHEEL FLANGES OF RAIL VEHICLES
Filed Oct. 29, 1925 2 Sheets-Sheet 1
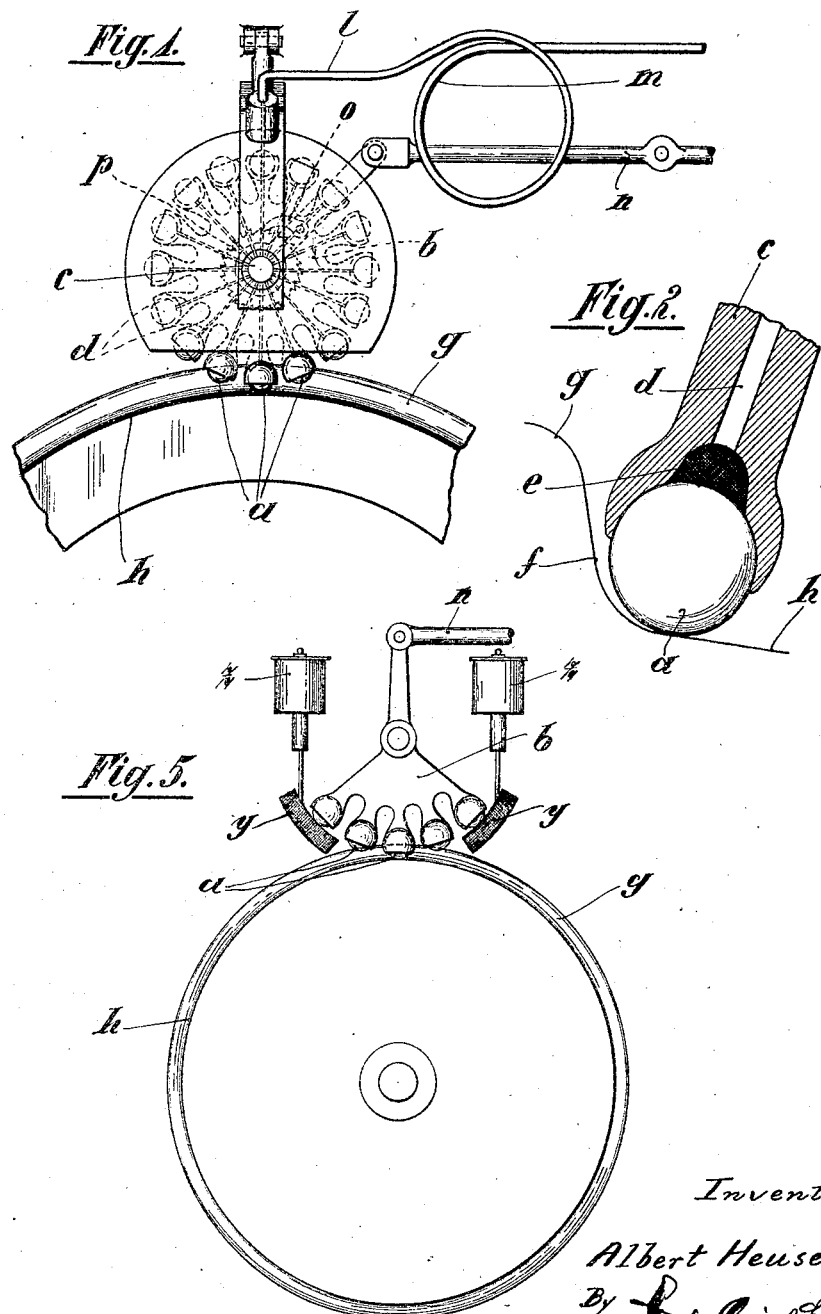

March 30, 1926.  
A. HEUSER  
1,579,110  
LUBRICATOR FOR THE WHEEL FLANGES OF RAIL VEHICLES  
Filed Oct. 29, 1925  2 Sheets-Sheet 2
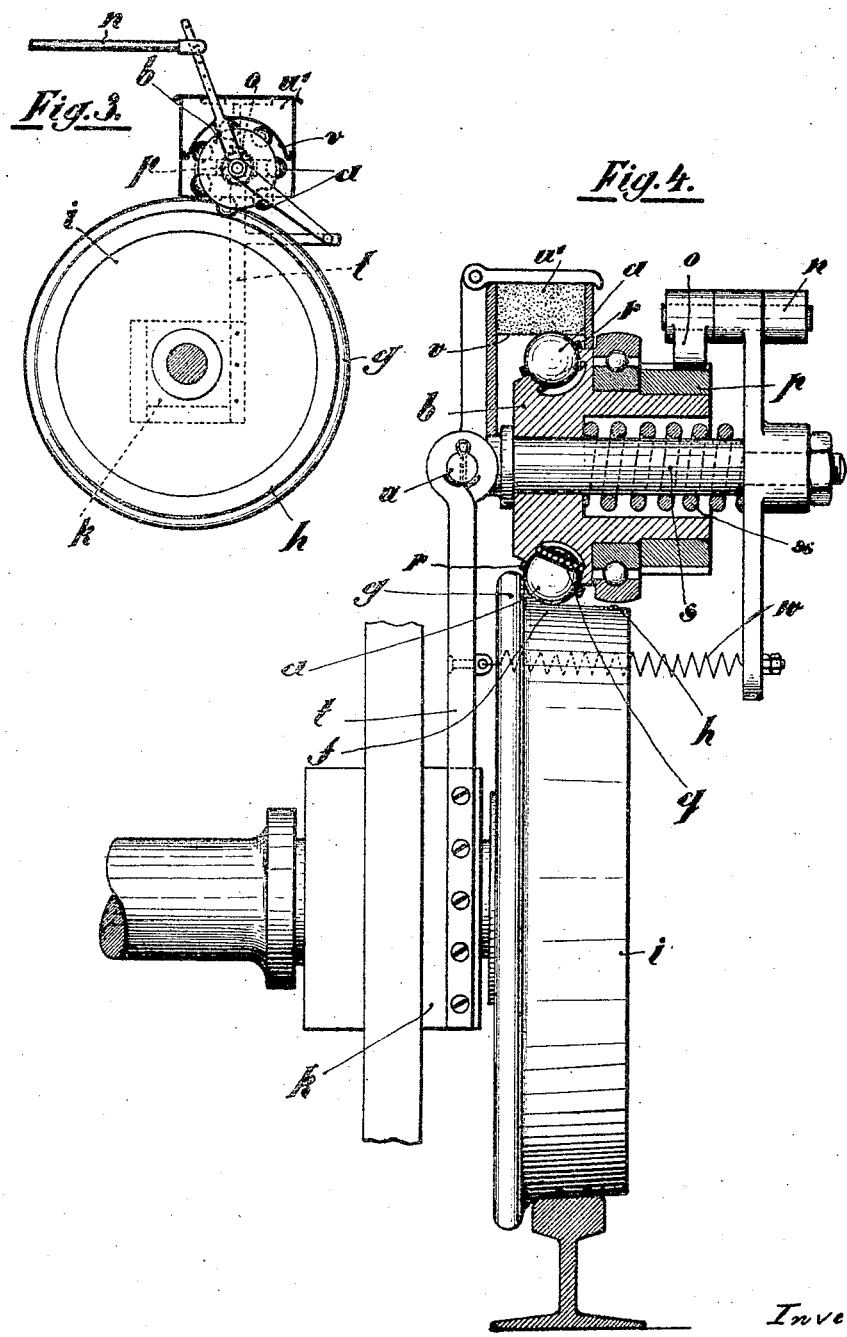
Inventor:  
Albert Heuser Patented Mar. 30, 1926.

1,579,110

UNITED STATES PATENT OFFICE.

ALBERT HEUSER, OF STUTTGART, GERMANY.

LUBRICATOR FOR THE WHEEL FLANGES OF RAIL VEHICLES.

Application filed October 29, 1925. Serial No. 65,695.

*To all whom it may concern:*

Be it known that I, ALBERT HEUSER, a citizen of Germany, residing at 21 Ehmannstrasse, Stuttgart, Wurttemberg, Germany, have invented certain new and useful Improvements in Lubricators for the Wheel Flanges of Rail Vehicles, of which the following is a specification.

The present invention relates to a device for lubricating the flanges of the wheels of vehicles running on rails, particularly those of locomotives, and moreover to the lubrication of just that part of the wheel flange which is subjected to the most wear and tear, namely the rounded angle formed by the flange and the tread of the wheel.

The invention contemplates the provision of a lubricating device, in which the lubricating agent, such as grease or oil, is supplied to the tread and flange of the wheel by balls, which are brought alternately into contact with the flange of the wheel and are continuously or intermittently supplied with a lubricant. For this purpose the balls, which act as transferrers for the lubricant, are arranged in the form of a circle or sector in a casing or cage, which has a rotary or pendulum-like feed motion imparted to it relatively to the tread of the wheel, so that a fresh ball is always brought into contact with the tread or flange of the wheel to be lubricated. The use of balls enables them to be brought as carriers of the lubricant into contact simultaneously with the tread of the wheel and with the flange parts which have an entirely different peripheral speed. Any heating up of the balls which supply the lubricant is prevented by their remaining in contact with the wheel for a short time only and then being moved on automatically. The method of supplying the lubricant and moving the balls on may be any that may be desired.

The lubricating device according to the present invention is also so arranged that the balls are enabled to follow not only all movements of the axle vertically but also any axial movements of the wheel.

The subject matter of the present invention is illustrated in the accompanying drawing by several constructional forms by way of example.

Figure 1 shows in elevation an oil feed lubricating device with balls arranged in the form of a circle.

Figure 2 is a transvese sectional elevation of a portion of the ball lubricating device, drawn on a larger scale than Fig. 1.

Figure 3 is an elevation of a modified form of construction for lubricating by means of grease, also with the balls arranged in a circle.

Figure 4 is an enlarged view of this lubricating device in partial axial section.

Figure 5 is an elevation of another constructional form of lubricator with the balls arranged in form of a sector.

In the constructional form shown in Figure 1 the balls $a$ are arranged in a circle in a disc-like casing or cage $b$, from the axle $c$ of which they are supplied with the lubricating oil through radial passages $d$ for example which terminate at a felt pad $e$ or the like against which the balls bear. The ball casing $b$ is mounted to rotate on its axle $c$ and is arranged at an angle relatively to the plane of the wheel so that the balls $a$ run freely in the angle $f$ between the flange $g$ and the tread $h$ of the wheel $i$. The whole arrangement is connected to the axle bearing $k$, so that it automatically follows every vertical movement of the wheel. The oil is supplied to the ball casing $b$ through a pipe $l$ for example which is provided with a flexible expansion loop $m$. Whether the oil be supplied by one of the well known forced lubrication devices or from a reservoir by gravity is immaterial as far as the present invention is concerned.

The ball which is lubricated by the oil-saturated felt pad $e$ consequently bears against the wheel and the flange thereof and rolls over them in accordance with the varying peripheral speed of its points of contact. After the wheel has revolved a certain number of times the ball casing is turned a step by means of a ratchet lever $n$, pawl $o$ and ratchet $p$ so that a fresh ball is brought into contact with the periphery of the wheel.

Figures 3 and 4 show a preferred form of construction for lubrication by means of grease. In this also the balls $a$ are mounted in a casing $b$ but are held on ball bearings $q$ by cages $r$. The casing $b$ is also adapted to rotate on an axle $s$ which is pivotally connected by means of a bolt $u$ to a supporting bracket $t$ fixed to the axle bearing $k$. The ball casing $b$ is moved around by means of a ratchet wheel $p$ pawl $o$ and ratchet lever $n$ as in the first mentioned constructional form.

Above the ball casing is mounted a grease reservoir $w^1$ through the arched sieve $v$ in the bottom of which the grease exudes and adheres to the balls which pass over the sieve and squeeze the grease out of it.

In order to make the apparatus yield to the necessary movements of the axle, the axle $s$ of the ball casing is pivotally connected as already stated to its carrier bracket $t$, while the balls are pressed both by the weight of the device and by an eccentrically acting spring $w$ against the flange of the wheel. A spring $x$ is also provided which surrounds the axle $s$ and presses the casing $b$ against the flange of the wheel in such a way that the balls are brought into contact therewith reliably and yet are able to yield to any axial movement of the wheel.

Figure 5 shows more diagrammatically an arrangement in which the balls $a$ are arranged in a sector-shaped casing $b$ and are supplied with the lubricant by pads $y$ with which they are brought into contact alternately by a pendulum-like movement and which are supplied with the lubricant from reservoirs $z$.

Having now particularly described and ascertained the nature of my said invention and in what manner the same is to be performed I declare that what I claim is:—

1. A vehicle wheel lubricator, comprising a series of balls arranged in an arcuate row; means for supplying lubricant to the balls; and means for bringing the balls successively into operative engagement with the tread of a wheel to be lubricated.

2. A vehicle wheel lubricator, comprising a series of balls; a carrier wherein the balls are arranged in an arcuate row; means for supplying lubricant to the balls; and means for shifting the position of the carrier to bring the balls successively into operative engagement with the tread of a wheel to be lubricated.

3. A lubricator, according to claim 2, in which the ball carrier is so arranged as to cause the balls to travel in the angle between the flange and the tread of the wheel.

4. A vehicle wheel lubricator, comprising a series of balls, a rotatably mounted carrier wherein the balls are arranged in an arcuate row; means for supplying lubricant to the balls; and means for imparting rotary movement to the carrier to bring the balls successively into operative engagement with the tread of a wheel to be lubricated.

5. A vehicle wheel lubricator, comprising a circular series of balls; a carrier wherein the balls are mounted; means for supplying lubricant to the balls; and a pawl-and-ratchet device for imparting a step-by-step rotary movement to the carrier to bring the balls successively into operative engagement with the tread of a wheel to be lubricated.

6. A vehicle wheel lubricator, comprising a series of balls; a carrier wherein the balls are arranged in an arcuate row; a grease reservoir above the carrier having a perforated bottom through which the grease exudes; and means for shifting the position of the carrier to bring the successive balls first into contact with the exuded grease and then into operative engagement with the tread of a wheel to be lubricated.

7. A vehicle wheel lubricator, comprising a series of balls; a carrier wherein the balls are arranged in an arcuate row; a grease reservoir above the carrier having a bottom formed by an arched sieve through which the grease exudes; and means for shifting the position of the carrier to bring the successive balls first into contact with the exuded grease and then into operative engagement with the tread of a wheel to be lubricated.

8. A vehicle wheel lubricator, comprising a series of balls; a carrier wherein the balls are arranged in an arcuate row; a grease reservoir above the carrier having a perforated bottom through which the grease exudes; and means for imparting a step-by-step rotary movement to the carrier to bring the successive balls first into contact with the exuded grease and then into operative engagement with the tread of a wheel to be lubricated.

9. A vehicle wheel lubricator, comprising a series of balls; a carrier wherein the balls are arranged in a circular row; a supporting bracket for the carrier connected to the axle of the wheel to be lubricated so as to move therewith; means for supplying lubricant to the balls; and means for shifting the position of the carrier to bring the balls successively into operative engagement with the tread of the wheel.

10. A vehicle wheel lubricator, comprising a series of balls; a carrier wherein the balls are arranged in a circular row; a supporting bracket for the carrier connected to the axle of the wheel to be lubricated so as to move therewith; an axle whereon the carrier is revolubly mounted pivotally attached to said bracket; means for supplying lubricant to the balls; and means for imparting rotary movement to the carrier to bring the balls successively into operative engagement with the tread of the wheel.

In testimony whereof I affix my signature.

ALBERT HEUSER.